United States Patent
Haskin et al.

(10) Patent No.: US 9,261,759 B1
(45) Date of Patent: Feb. 16, 2016

(54) ASPECT CORRECTED LASER VIDEO PROJECTION

(75) Inventors: Menashe Haskin, Palo Alto, CA (US); Christopher D. Coley, Morgan Hill, CA (US)

(73) Assignee: Amazon Technologies, Inc., Seattle, WA (US)

(*) Notice: Subject to any disclaimer, the term of this patent is extended or adjusted under 35 U.S.C. 154(b) by 651 days.

(21) Appl. No.: 13/601,639

(22) Filed: Aug. 31, 2012

(51) Int. Cl.
*G03B 21/14* (2006.01)

(52) U.S. Cl.
CPC .................. *G03B 21/147* (2013.01)

(58) Field of Classification Search
None
See application file for complete search history.

(56) References Cited

U.S. PATENT DOCUMENTS

| | | | |
|---|---|---|---|
| 2006/0204125 A1* | 9/2006 | Kempf et al. | 382/274 |
| 2011/0205497 A1* | 8/2011 | Wakabayashi et al. | 353/28 |
| 2012/0127184 A1* | 5/2012 | Satoh et al. | 345/530 |
| 2013/0016070 A1* | 1/2013 | Starner et al. | 345/175 |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Maurice L McDowell, Jr.
(74) *Attorney, Agent, or Firm* — Lee & Hayes, PLLC (57) ABSTRACT

Techniques are described for compensating for distortion effects caused by projecting images to a surface that is non-perpendicular to a raster-scanning laser projector. Pixel size is modulated such that smaller pixels are projected to farther portions of the surface, and larger pixels are projected to nearer portions. Pixels within a raster scan line may have their lengths modulated through variation of a frequency of light source that generates the pixels, or through adjustment of a scan speed along the line. Pixel heights may be adjusted by modulating the distance between scan lines. Scan speed and distance between scan lines may be modified by controlling micromirrors incorporated into the laser projector for directing the light projection.

28 Claims, 7 Drawing Sheets

ASPECT CORRECTED LASER VIDEO PROJECTION

BACKGROUND

Projectors are used in many scenarios to create a visual display of information on a surface. However, when the projector is not parallel to the surface (e.g., when the line of projection from the projector to the surface is not perpendicular to the surface), the projection may be distorted. For example, when a projector is sitting on a table facing upward toward the projection surface, the projected image appears larger at the top than at the bottom. This distortion effect is commonly referred to as the keystone effect, given that the effect tends to distort the projected image into a trapezoid shape (i.e., the shape of an architectural keystone).

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Embodiments are described for aspect correction of projected images, to correct for keystone effects when projecting to a surface that is non-perpendicular to the projector or otherwise irregular. Normally a raster-scanning laser projector scans an area of the projection surface in parallel lines, and each pixel of the projected image has the same size (e.g., length and height). Although use of same-sized pixels may provide an adequate quality projected image when the projector is perpendicular to the surface, some amount of keystone effect distortion generally occurs when projecting to a non-perpendicular surface or to a surface that is not locally flat at all points.

Figure 1A:
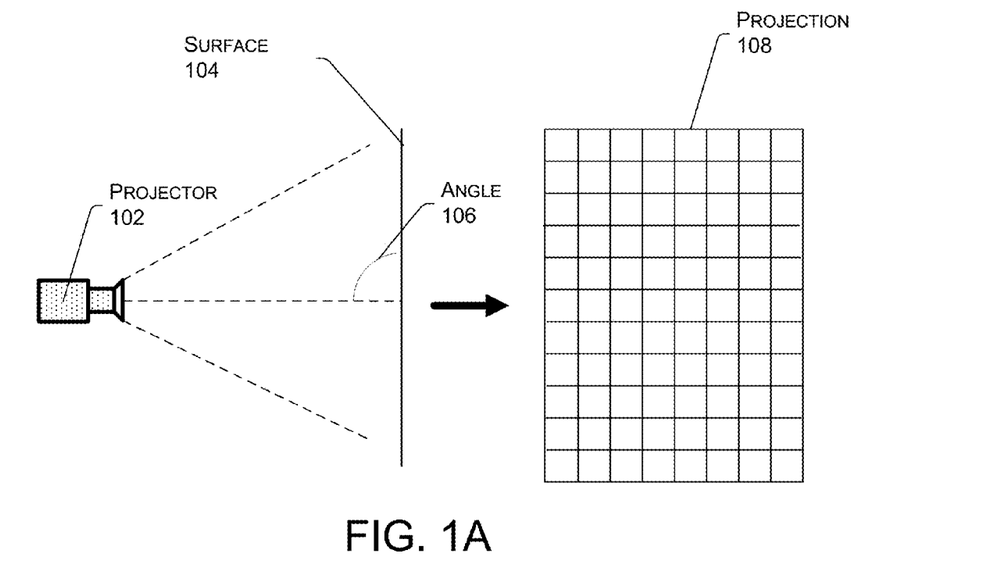
FIGS. 1A and 1B depict an example of the keystone effect distorting a projected image.
Figure 1B:
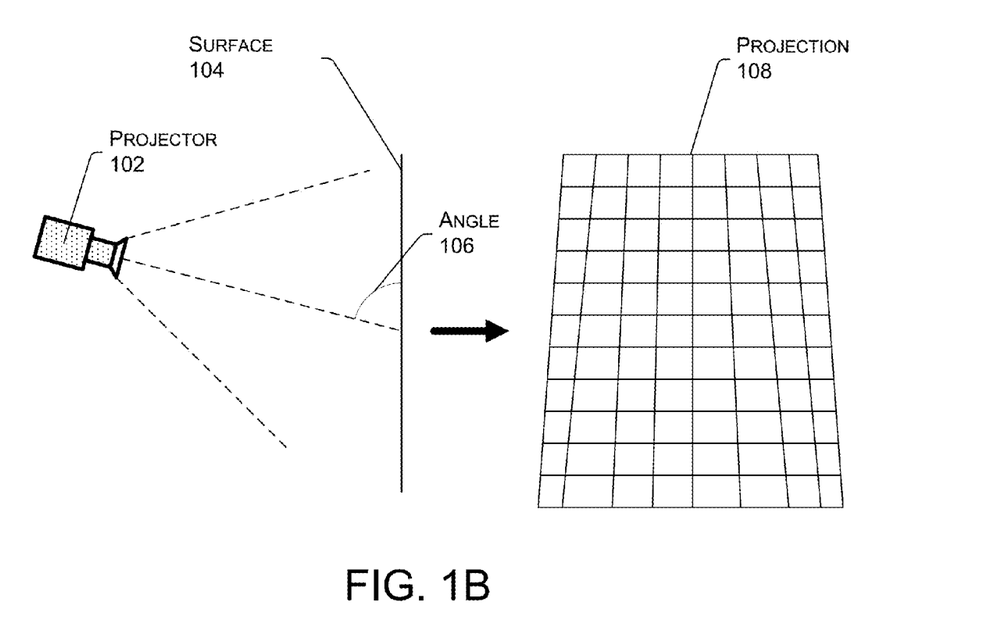

Such a distortion is illustrated in FIGS. 1A and 1B. FIG. 1A shows example scenario in which a projector 102 projects an image onto a surface 104, where the angle of incidence 106 of the projection is approximately perpendicular. In such a scenario, the projection 108 (shown in this example from the viewpoint of the projector) is approximately rectangular and without distortion. FIG. 1B shows an example scenario in which the projector 102 is at an angle to surface 104, such that the angle of incidence 106 is non-perpendicular. In such a scenario, the projection 108 (again shown from the viewpoint of the projector) exhibits a distortion due to the keystone effect and is more trapezoidal.

Embodiments correct such a distortion as part of a raster scanning projection process. In some embodiments, within each scan line, the lengths of pixels in the projected line are modulated such that length of each pixel projected onto the surface is approximately equal. For example, when projecting onto portions of the surface closer to the projector, longer pixels may be projected. When projecting onto portions of the surface farther from the projector, shorter pixels may be projected. Because the keystone effect tends to distort same-sized pixels to appear smaller if projected onto a closer surface, this adaptation in pixel size compensates for the distortion to provide projected pixels of similar size.

Embodiments support various methods for changing the length of pixels in a scan line. In some embodiments, a modulation frequency for a light emitter that generates the pixels is varied to modify the pixel lengths. For example, during rasterization embodiments may change the length of pixels by turning on or off a light emitting device (e.g., a laser). If the light emitting device is left on for a longer period, then the generated pixel is longer. In some embodiments, a modulation intensity may be varied along with the frequency to provide for a more equal intensity of the projected pixels even as the frequency of pixel generation is altered.

In other embodiments, a scanning speed is varied by changing a speed at which various scan-controlling mirrors are moving with the raster-scanning laser projector. In this example, slower movement of the mirrors leads to shorter pixels, and faster movement of the mirrors leads to longer pixels. In some cases, it may be more feasible to control the frequency for pixel generation than to control the scan speed, particularly at those speeds at which pixel variations occur within the exemplary systems described herein.

Moreover, in some embodiments the height of pixels is similarly adjusted to compensate for distortion. For example, when projecting an image that includes multiple raster-scanned lines, the distance between the lines could be modulated so that it is variable across the lines. If the projection surface is closer to the projector then the lines would tend to be closer together thus distorting the projected image, so embodiments operate to compensate by projecting the lines further apart. In some embodiments, this may be accomplished by modulating the angle at which a mirror within a raster-scanning laser projector reflects the beam, to project the lines with a more equal spacing on the projection surface. Some embodiments may employ multiple mirrors for controlling scanning (e.g., two mirrors for two dimensional adjustment), and in such cases the movement speed of each mirror may be modified to achieve the desired line spacing and/or scanning speed.

Some embodiments employ raster-scanning laser projectors that include micro-electromechanical system (MEMS) mirrors to control direction and movement of the scan line. In such cases, the pixel height may be altered by changing the direction of the MEMS mirrors through a change in the excitation voltage. Because MEMS mirrors tend to seek a resonant mode of vibration, in some cases it may be difficult to use position changing of MEMS mirrors to control scanning speed across raster lines. Thus, some embodiments may use the frequency alteration method described above to control pixel length, while using MEMS mirror adjustments to control pixel height by varying line spacing.

Further, some embodiments may employ multi-surfaced mirrors (e.g., hexagonal or octagonal mirrors) instead of or in addition to MEMS mirrors. Such multi-surfaced mirrors rotate at a controllable frequency and provide a reflection (e.g., a light emission for pixel generation) each time a mirror passes a laser. Thus, pixel generation lengths may be controlled by controlling the rotational frequency of the multi-surfaced mirror.

Moreover, instead of scanning each line one after another some embodiments may employ array of elements (e.g., a number of laser diodes) to scan multiple lines at once. In such cases, line spacing may be controlled with multiple MEMS mirrors, one MEMS mirror in front of each element. The MEMS mirrors may be set at different angles to modulate the line spacing as the scan progresses. In this way, batches of an area or a whole area may be scanned at once.

Further, some embodiments may generate multiple scan lines by directing a laser or other light source through a bar generator to light a line of spacial light modulators such as digital light processing (DLP) or liquid crystal display (LCD) elements, so that each element provides a scan line. MEMS mirrors may then be employed to increase or decrease the distance between lines. In such cases, other light sources than a laser may be used. For example, a light-emitting diode (LED) may be employed. However, because a LED does not generate collimated, coherent light as generated by a laser, use of LEDs for a light source may introduce additional optical effects that may be avoided through use of a laser for a light source.

Illustrative Environment

Figure 2:
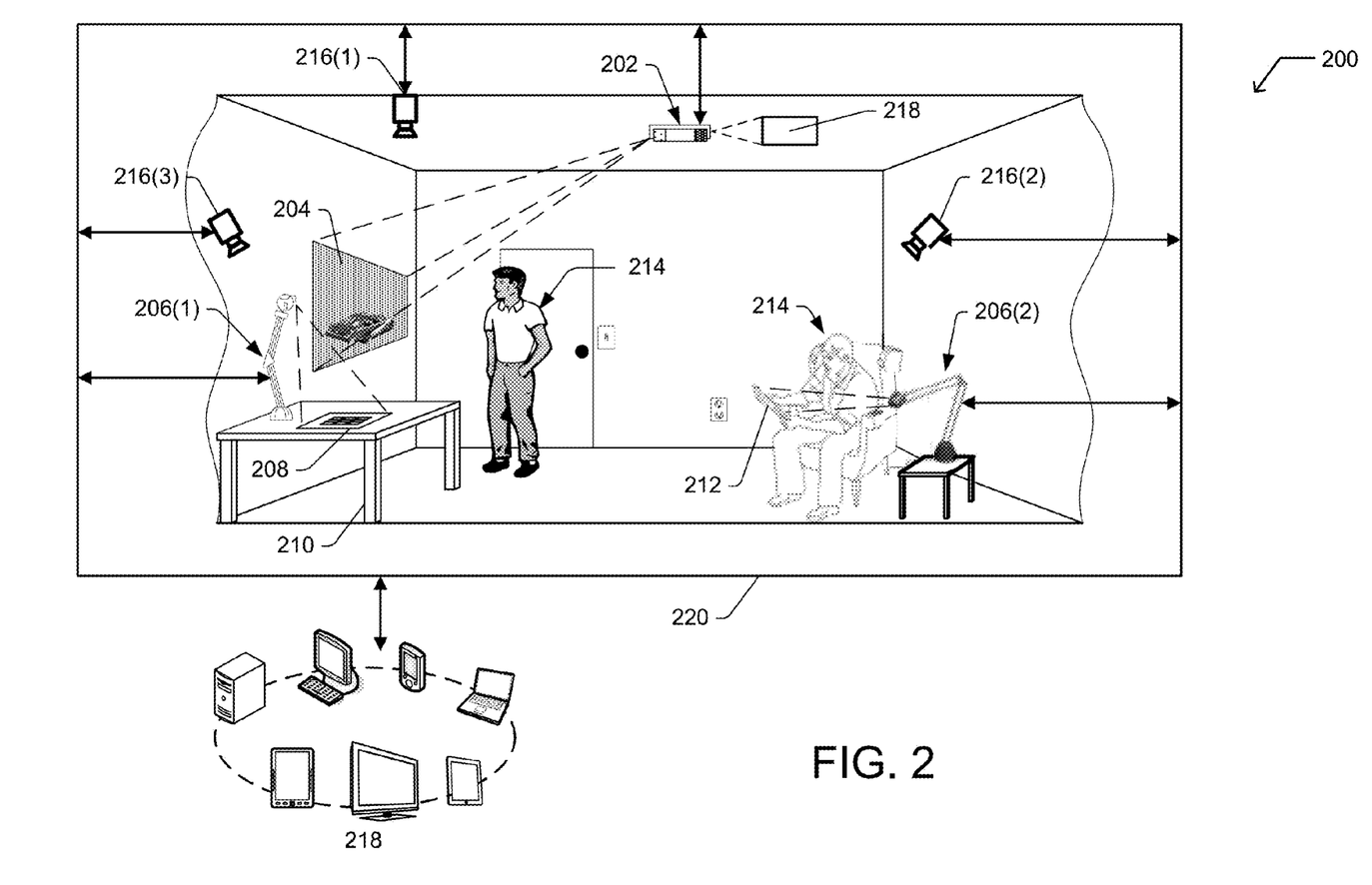
FIG. 2 depicts example environments in which embodiments may operate.

FIG. 2 shows an example environment 200 in which embodiments may operate. In the example shown, environment 200 is an indoor space (e.g., a home, office, or other environment). However, some embodiments may also operate in an outdoor setting or some combination of indoor and outdoor space. In the example shown, environment 200 includes a surface-mounted augmented reality functional node (ARFN) 202. In embodiments, an ARFN may include one or more projectors, cameras and other sensors, and/or computing resources (e.g., a computing device 218) to generate an augmented reality environment. In the example shown, the surface-mounted ARFN 202 projects a display 204 onto a wall, screen or other surface or object. As described herein, such projection may be onto a surface that is non-perpendicular to the projector, and the projected pixels may be adjusted in size to compensate for the distortion caused. Embodiments also support the use of a network-connected display device such as a monitor, television, or other type of display to display information to a user.

As shown, environment 200 may also include one or more ARFNs sitting atop surfaces, such as ARFNs 206(1) and 206(2). In some embodiments, such ARFNs may sense the location of users and/or objects, and project a display or other visual information onto a surface. Although in this example ARFNs 206(1) and 206(2) are depicted as configured similarly to table lamps, other ARFN configurations are supported by embodiments. The ARFNs in environment 200 may project a display 208 onto a stationary object such as a table 210, or a hand-held or otherwise more mobile object such as a hand-held object 212 held by user 214. ARFNs are described in further detail with reference to FIG. 3. Embodiments may employ any number of ARFNs to project images and/or gather sensor information about environment 200. Moreover, although not shown in FIG. 2, embodiments support projectors not incorporated into ARFNs for displaying information.

Moreover, in some embodiments, environment 200 may also include one or more sensor devices not associated with ARFNs, such as sensors 216(1), 216(2), and 216(3). Such sensor devices may incorporate any sensor technology that operates to detect position and/or movement of objects and/or portions of objects in a space such as environment 200. Sensor devices may include cameras or other sensors to detect visible light, infrared light, or other types of electro-magnetic radiation. In some embodiments, sensor devices may include time-of-flight (ToF) cameras that determine distance to an object (e.g., to a projection surface) based on measuring the time-of-flight of the light travelling between the object and the camera. Sensor devices may also incorporate other types of Light Detection and Ranging (LIDAR) optical sensing technologies. Sensor devices may also include RGB cameras, or RGBZ cameras that include both ToF and RGB sensors. Moreover, in some embodiments distance to an object may be adjusted manually instead of, or in addition to, the automated distance-measuring techniques described above.

Although sensors 216(1), 216(2), and 216(3) are depicted as cameras, embodiments are not so limited and may employ sensors to collect other types of information. For example, sensors may include pressure sensors (e.g., on a touchpad) to detect physical pressure caused by the presence or motion of an object or person, charge sensors to detect an electric charge and/or magnetic field caused by a presence or motion of an object or person, microphones to detect sonic, infrasonic, and/or ultrasonic data and locate their source, light reflection detectors to detect location or motion of objects based on reflected light (e.g., coherent light such as that in a laser). In embodiments, sensors of various types may be arranged in a particular configuration within environment 200 to collect data suitable as input to a triangulation or other data analysis algorithm, to determine locations, identifications, and/or movements of objects or persons within environment 200.

In some embodiments, environment 200 may also include one or more computing device(s) 218. In some embodiments, computing device(s) 218 may be owned by, operated by, and/or otherwise associated with user 214. Computing device(s) 218 may include any type of computing device, including but not limited to desktop computers, network computers, server computers, workstations, personal computers, laptop computers, tablet computers, electronic book (eBook) readers, wearable computers, mobile phones, automotive computers, personal data assistants (PDAs), game consoles, mobile gaming devices, and the like. As shown in FIG. 2, computing device(s) 218 may be incorporated into ARFN(s) 202, 206(1), and/or 206(2), or may be separate, stand-alone computing device(s) that communicate with ARFN(s) via networks 220.

As described further herein, computing device(s) 218 may include one or more software components that receive sensor data from sensors incorporated into ARFNs or stand-alone sensors, analyze the data to determine distance(s) from a projector to a projection surface, and modify pixels to compensate for distortion.

In some embodiments, components of computing device(s) 218 may analyze sensor data to detect a presence, location, and/or movements of user 214 and/or objects (e.g., 210 and 212) available for projection surfaces, modify projected pixels to compensate for distortion, and/or select a surface and/or nearby projector for projecting a display based on the location of user 214. Components of computing device(s) 218 may also include components for identifying and/or authenticating user 214. Computing device(s) 218 are described further herein with reference to FIG. 4.

The devices of environment 200 may communicate with one another and with external devices via one or more networks 220. Networks 220 may include public networks such as the Internet, private networks such as an institutional and/or personal intranet, or some combination of private and public networks. Networks 220 may also include any type of wired and/or wireless network, including but not limited to local area networks (LANs), wide area networks (WANs), Wi-Fi, WiMax, and mobile communications networks (e.g. 3G, 4G, and so forth). Networks 220 may utilize communications protocols, including packet-based and/or datagram-based protocols such as internet protocol (IP), transmission control protocol (TCP), user datagram protocol (UDP), or other types of protocols. Moreover, networks 220 may also include a number of devices that facilitate network communications and/or form a hardware basis for the networks, such as switches, routers, gateways, access points, firewalls, base stations, repeaters, backbone devices, and the like.

Illustrative ARFN Architecture

Figure 3:
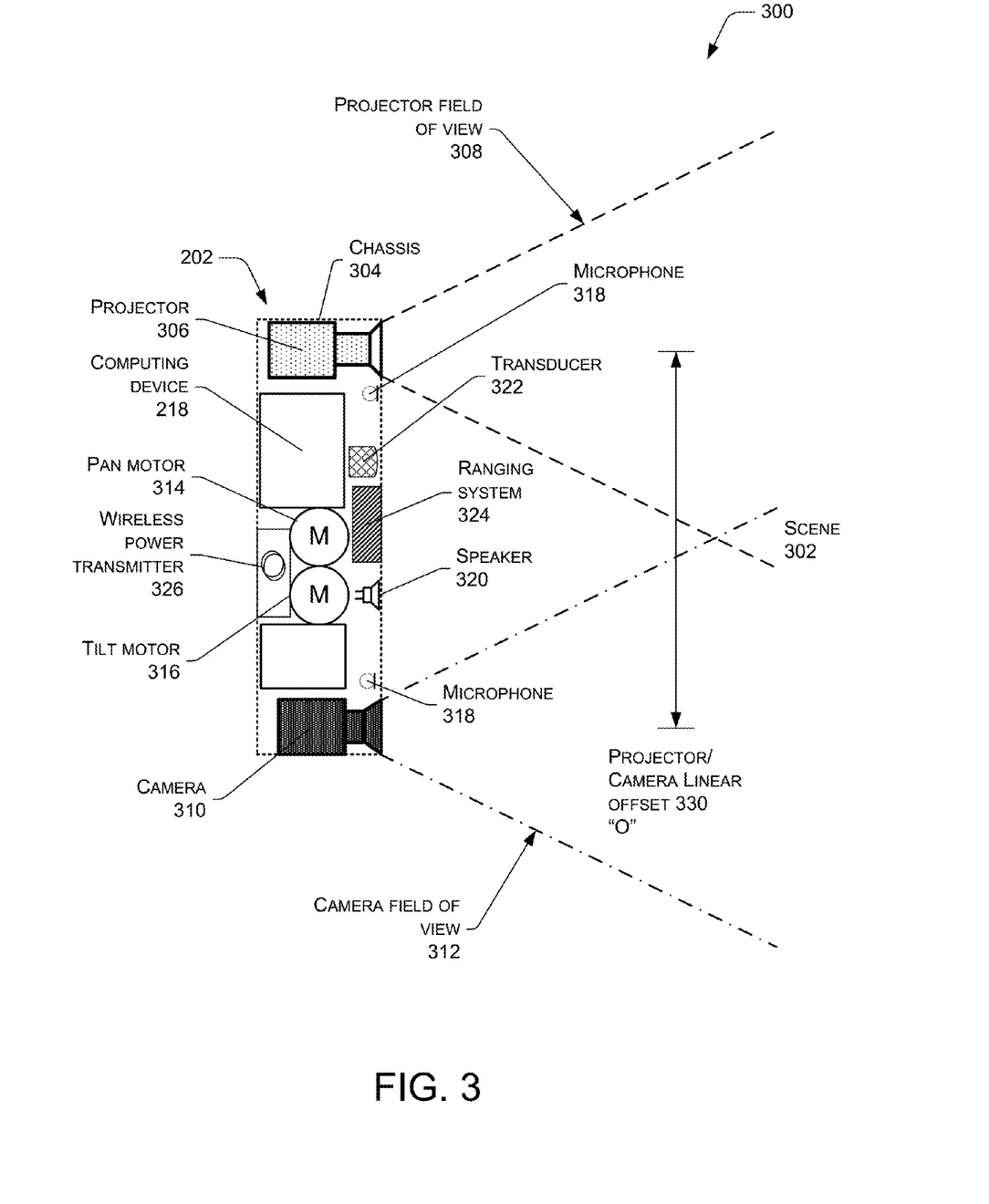
FIG. 3 shows an illustrative schematic of an augmented reality functional node.

FIG. 3 shows one illustrative schematic 300 of an ARFN, such as ARFNs 202 and 206 shown in FIG. 2. While FIG. 3 illustrates one potential arrangement of an ARFN, other ARFNs may include the same or different components in any other type of arrangement. In the example shown, the ARFN 202 is configured to scan at least a portion of a scene 302 (e.g., a scene within environment 200) and/or the objects therein. The ARFN 202 may also be configured to provide augmented reality output, such as images, sounds, and so forth. In some embodiments, ARFN 202 may include a computing device that determines pixel modifications to compensate for distortion, as described further herein.

In the example shown, a chassis 304 holds the components of the ARFN 202. The chassis 304 may house a projector 306 that generates and projects images into a scene 302. These images may be visible light images perceptible to the user, visible light images imperceptible to the user, images in non-visible light (e.g., infrared radiation or some other non-visible portion of the electromagnetic spectrum), or any combination thereof. The projector 306 may be implemented with any number of technologies capable of generating an image and projecting that image onto a surface within the environment. Suitable technologies include a liquid crystal display, (LCD), and so forth. The projector 306 may have a projector field of view 308 which describes a particular solid angle. The projector field of view 308 may vary according to changes in the configuration of the projector. For example, the projector field of view 308 may narrow upon application of an optical zoom to the projector. In some implementations, a plurality of projectors 306 may be used. Further, in some implementations, the projector 306 may be further configured to project patterns, such as non-visible infrared patterns, that can be detected by camera(s) or other sensors and used for 3D reconstruction and modeling of the environment. The projector 306 may comprise a microlaser projector, a digital light projector (DLP), cathode ray tube (CRT) projector, liquid crystal display (LCD) projector, light emitting diode (LED) projector, or other projection technologies.

In some embodiments, a camera 310 may also be housed within the chassis 304. The camera 310 may be configured to image the scene in visible light wavelengths, non-visible light wavelengths, or both. The camera 310 may be implemented in various ways. In some cases, the camera may be embodied an RGB camera. In other cases, the camera may include ToF sensors. In still other cases, the camera 310 may be an RGBZ camera that includes both ToF and RGB sensors. The camera 310 may have a camera field of view 312 which describes a particular solid angle. The camera field of view 312 may vary according to changes in the configuration of the camera 310. For example, an optical zoom of the camera may narrow the camera field of view 312. In some implementations, a plurality of cameras 310 may be used.

The chassis 304 may be mounted with a fixed orientation, or be coupled via an actuator to a fixture such that the chassis 304 may move. Actuators may include piezoelectric actuators, motors, linear actuators, and other devices configured to displace or move the chassis 304 or components therein such as the projector 306 and/or the camera 310. For example, in at least one implementation, the actuator may comprise a pan motor 314, tilt motor 316, and so forth. The pan motor 314 is configured to rotate the chassis 304 in a yawing motion. The tilt motor 316 is configured to change the pitch of the chassis 304. By panning and/or tilting the chassis 304, different views of various scenes within the environment may be acquired. In some embodiments, the user/object tracking module 422 (further described with regard to FIG. 4) may use the different views to track or otherwise monitor objects and/or users within the environment.

In some embodiments, one or more microphones 318 may be housed within the chassis 304, or elsewhere within the environment 200. These microphones 318 may be used to acquire voice or sound input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function such as the display of a keyboard arrangement onto a nearby surface or the rendering of an abstract keyboard arrangement into a nearby space. The user may alternatively use voice commands. Such audio inputs may be located within the scene using time-of-arrival differences among multiple microphones and used to determine an active zone (e.g., a zone in which a user and/or object(s) are present and/or active) within the augmented reality environment. Further, the microphones 318 may be used to receive voice input from the user for purposes of identifying and authenticating the user. The voice input may be received and passed to the user identification/authentication component 420 (described with reference to FIG. 4) for analysis and verification.

One or more speakers 320 may also be present to provide audible output. For example, the speakers 320 may be used to provide output from a text-to-speech module, to playback pre-recorded audio, to provide audio associated with a multimedia presentation, and so forth.

A transducer 322 may be present within the ARFN 202, or elsewhere within the environment 200, and configured to detect and/or generate inaudible signals, such as infrasound or ultrasound. The transducer may also employ visible or non-visible light to facilitate communication. These inaudible signals may be used to provide for signaling between accessory devices and the ARFN 202, and/or between ARFN 202 and other ARFNs in environment 200.

A ranging system 324 may also be provided in the ARFN 202 to provide data describing a distance from the ARFN to an object or set of objects. The ranging system 324 may comprise radar, LIDAR, ultrasonic ranging, stereoscopic ranging, and so forth. In some implementations, the transducer 322, the microphones 318, the speaker 320, or a combination thereof may be configured to use echolocation or echo-ranging to determine distance and spatial characteristics.

A wireless power transmitter 326 may also be present in the ARFN 202, or elsewhere within the augmented reality environment. The wireless power transmitter 326 may be configured to transmit electromagnetic fields suitable for receipt by a wireless power receiver and conversion into electrical power for use by active components in other electronics. The wireless power transmitter 326 may also be configured to transmit visible light and/or non-visible electromagnetic radiation to communicate power. The wireless power transmitter 326 may utilize inductive coupling, resonant coupling, capacitive coupling, and so forth.

In this illustration, the computing device 218 is shown within the chassis 304. However, in other implementations all or a portion of the computing device 218 may be disposed in another location and coupled to the ARFN 202 (e.g., through network 220). This coupling may occur via wire, fiber optic cable, wirelessly, or a combination thereof. Furthermore, additional resources external to the ARFN 202 may be accessed, such as resources in other ARFN(s), external sensor(s), external projector(s), and/or other computing device(s) accessible via a local area network, cloud resources accessible via a wide area network connection, or a combination thereof.

The ARFN 202 is characterized in part by the offset between the projector 306 and the camera 310, as designated by a projector/camera linear offset 330, designated as "O" in FIG. 3. This offset is the linear distance between the projector 306 and the camera 310. Placement of the projector 306 and the camera 310 at distance "O" from one another aids in the recovery of structured light data from the scene. The known projector/camera linear offset "O" may also be used to calculate distances, dimensioning, and otherwise aid in the characterization of objects within the scene 302. In other implementations, the relative angle and size of the projector field of view 308 and camera field of view 312 may vary. Also, the angle of the projector 306 and the camera 310 relative to the chassis 304 may vary.

Due to this offset "O", the projector 306 and camera 310 employ separate optical paths. That is, the projector 306 employs a set of lenses to project images along a first optical path therein, and the camera 310 employs a different set of lenses to image the scene by capturing the light scattered by the surroundings.

In other implementations, the components of the ARFN 202 may be distributed in one or more locations within the environment 200. As mentioned above, microphones 318 and/or speakers 320 may be distributed throughout the environment as stand-alone devices or as part of other ARFN(s). In some embodiments, the projector 306, the camera 310, and/or other sensors may also be distributed throughout the environment 200 as stand-alone devices, and/or located in one or more separate chassis as part of separate ARFN(s) distributed in environment 200.

Illustrative Computing Device Architecture

Figure 4:
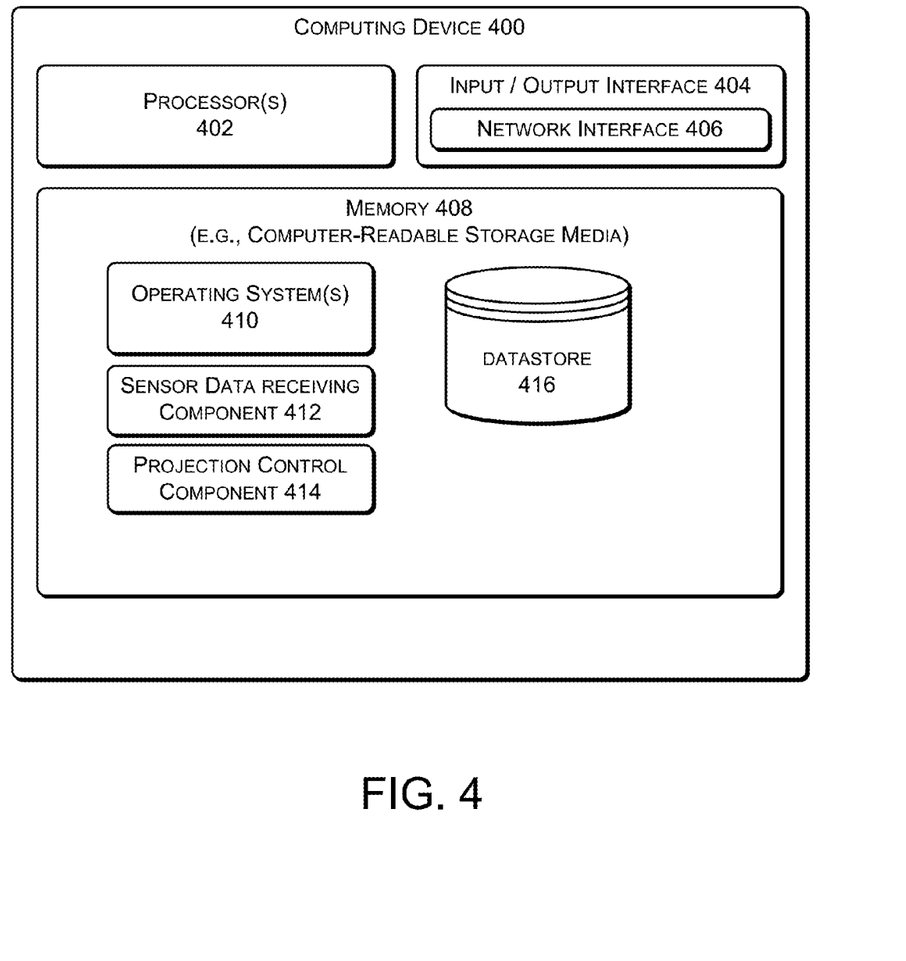
FIG. 4 depicts a diagram of an example architecture for a computing device.

FIG. 4 depicts an example computing device 400 that may be used to implement various embodiments described herein. For example, computing device 400 may provide an example system architecture for computing device(s) 218 that may be incorporated in an ARFN or external to an ARFN. In some embodiments, computing device 400 includes one or more processors 402. Processor(s) 402 may be implemented as hardware, software, or some combination thereof. Processor(s) 402 may also include computer-executable, processor-executable, and/or machine-executable instructions written in any suitable programming language to perform various functions described herein.

Computing device 400 may further include one or more input/output interfaces 404 to allow computing device 400 to communicate with other devices such as user input peripheral devices (e.g., a keyboard, a mouse, a pen, a game controller, a voice input device, a touch input device, gestural input device, and the like), and/or output peripheral devices (e.g., a display, a printer, audio speakers, a haptic output, and the like).

Input/output interface 404 may also include one or more network interfaces 406 to enable communications between computing device 400 and other networked devices (e.g., over network 220). Such network interfaces 406 may include one or more network interface controllers (NICs) or other type of transceiver device to send and receive communications over a network. Computing device 400 may also include one or more busses and/or other internal communications hardware or software that allow for the transfer of data and/or internal communications between the various components of computing device 400.

As shown in FIG. 4, computing device 400 includes a memory 408, which may include volatile memory such as random access memory (RAM), static random access memory (SRAM), dynamic random access memory (DRAM), cache memory, and the like. Memory 408 may also include non-volatile memory such as read only memory (ROM), flash memory, and the like. Moreover, memory 408 may also include cache memory, active memory, and/or physical memory used by various processes that run based on instructions and data stored within memory 408.

Memory 408 includes computer-readable storage media, which is a form of computer-readable media. Computer-readable storage media may include non-removable storage (e.g., a hard drive) and/or removable storage including magnetic disk storage, optical disk storage, tape storage, storage arrays, storage area networks, network attached storage, cloud storage, and the like. Disk drives and associated computer-readable media may provide non-volatile storage of computer readable instructions, data structures, program modules, and other data for the operation of computing device 400.

As used herein, computer-readable media includes two distinct types of media: storage media and communications media. With regard to storage media, embodiments may be provided as a computer program product stored on a non-transitory computer-readable or machine-readable storage medium. Computer-readable or machine-readable storage media includes tangible and/or non-transitory forms of media such as volatile and/or non-volatile memory. Such media may be included in a device and/or hardware component that is part of a device or external to a device, including but not limited to RAM, SRAM, DRAM, ROM, erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, or any other non-transmission memory, device, and/or medium that can be used to store and maintain information for access by a computing device. Computer storage media may store information in the form of instruction sets, data structures, applications, program modules and the like, that may be used to program a computing device or processor and thus enable a computing device or processor to perform actions. The stored information may be stored in a compressed or uncompressed form.

In contrast to the tangible storage media described above, communication media is non-tangible (e.g., transitory) and may include data (e.g., computer instruction sets, data structures, program modules, and the like) transmitted in a modulated data signal such as a carrier wave. Embodiments may also be provided as a computer program product including a transitory machine-readable signal (in compressed or uncompressed form). Examples of machine-readable signals, whether modulated using a carrier or not, include but are not limited to signals that a computer system or machine hosting or running a computer program can be configured to access, including signals downloaded through the Internet or other networks. For example, distribution of software may be via Internet download. Thus, tangible computer storage media does not include non-tangible communication media.

In some embodiments, memory 408 includes one or more executing operating systems (OS) 410, and one or more stored and/or executing processes including components, programs, or applications that are loadable and executable by processor(s) 402. In the example shown, memory 408 includes a sensor data receiving component 412 that receives sensor data from one or more sensors (e.g., sensors 216) indicating locations and/or movements of objects and/or persons. Memory 408 may also include a projection control component 414 that analyzes sensor data, determines distance(s) from a projector to a projection surface, and determines modification(s) to pixel length and/or height to compensate for distortion as described herein.

In some embodiments, memory 408 also includes a datastore 416 (e.g., a database) to store information for operations of computing device 400. For example, datastore 416 may store data used for operations of the components, applications, and/or operating systems in memory 408. Datastore 416 may also store received sensor data, user identification or authentication data, or other information. In some embodiments, some or all of the data used for operations of computing device 400 may be stored in a data storage device that is external to computing device 400.

Illustrative ARFN Operation

Figure 5:
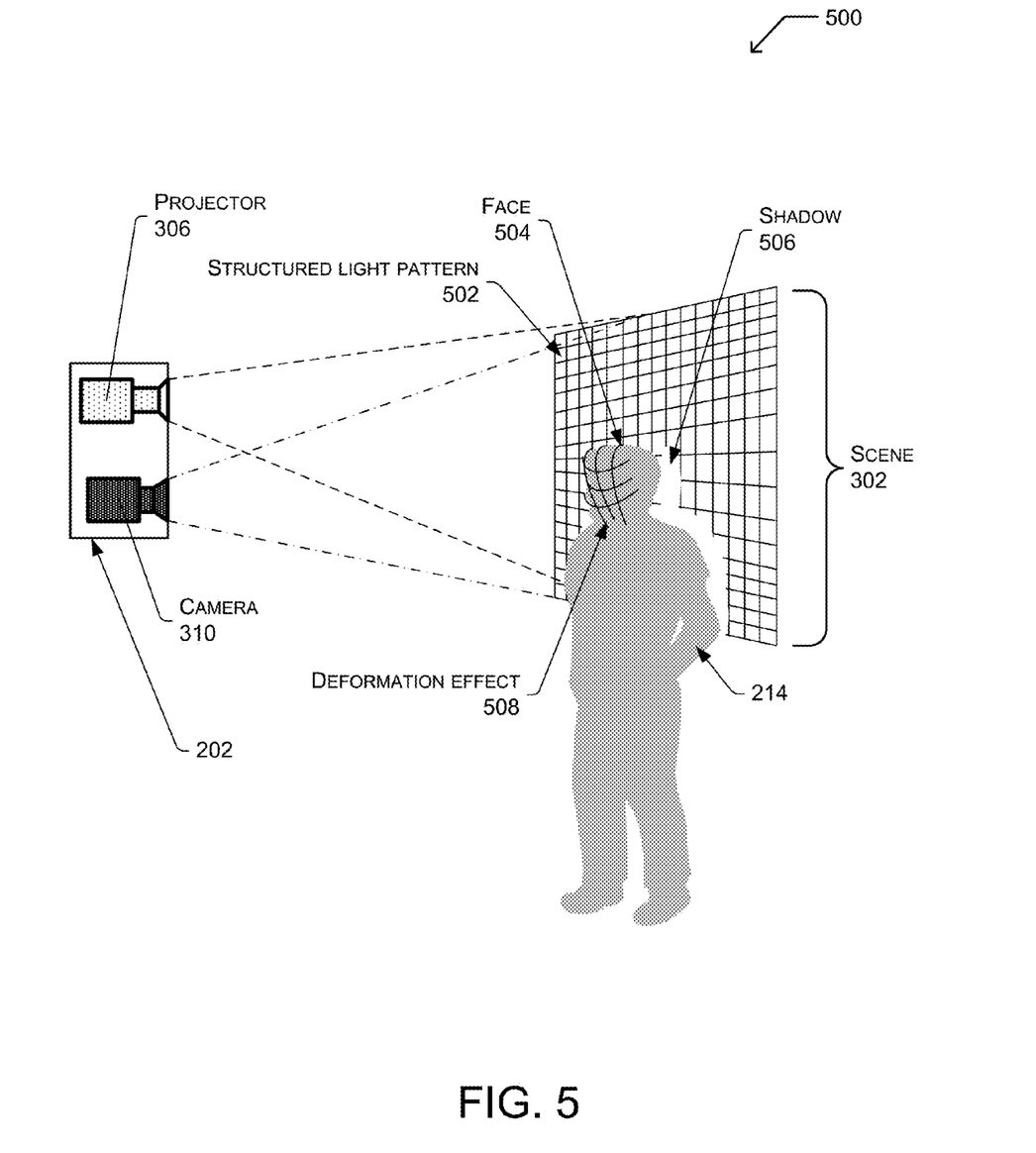
FIG. 5 illustrates an example operation of an augmented reality functional node of creating an augmented reality environment by projecting a structured light pattern on a scene and capturing a corresponding image of the scene.

FIG. 5 illustrates one example operation 500 of the ARFN 202 (or other ARFNs shown in FIG. 2) of creating an augmented reality environment by projecting a structured light pattern on a scene and capturing a corresponding image of the scene. In this illustration, the projector 306 within the ARFN 202 projects a structured light pattern 502 onto the scene 302. In some implementations, a sequence of different structure light patterns 502 may be used. This structured light pattern 502 may be in wavelengths which are visible to the user, non-visible to the user, or a combination thereof. The structured light pattern 502 is shown as a grid in this example, but not by way of limitation. In other implementations, other patterns may be used, such as bars, dots, pseudorandom noise (PN) patterns, and so forth. PN patterns may be particularly useful because a particular point within the PN pattern may be specifically identified. A PN function is deterministic in that given a specific set of variables, a particular output is defined. This deterministic behavior allows the specific identification and placement of a point or block of pixels within the PN pattern.

A user (e.g., user 214) is shown within the scene 302 such that the user's face 504 is between the projector 306 and a wall. A shadow 506 from the user's body appears on the wall. Further, a deformation effect 508 is produced on the shape of the user's face 504 as the structured light pattern 502 interacts with the facial features. This deformation effect 508 is detected by the camera 310, which is further configured to sense or detect the structured light. In some implementations, the camera 310 may also sense or detect wavelengths other than those used for structured light pattern 502. In some embodiments, the structured light pattern 502 may be formed from a coherent light source such as a laser. In other embodiments, unstructured light may be employed.

The images captured by the camera 310 may be used for any number of things. For example, some images of the scene are processed by the user/object tracking component 422 to characterize the scene 302. In some implementations, multiple cameras may be used to acquire the image. In other instances, the images of the user's face 504 (or other body contours, such as hand shape) may be processed by the user/object tracking component 422 to reconstruct 3D images of the user, which are then passed to the user identification/authentication component 420 for purposes of identifying, verifying, and/or authenticating the user.

Certain features of objects within the scene 302 may not be readily determined based upon the geometry of the ARFN 202, shape of the objects, distance between the ARFN 202 and the objects, and so forth. Accordingly, in some embodiments the user/object tracking component 422 may be configured to make one or more assumptions about the scene, and test those assumptions to constrain the dimensions of the scene 302 and maintain the model of the scene.

Illustrative Projector Arrangement

Figure 6:
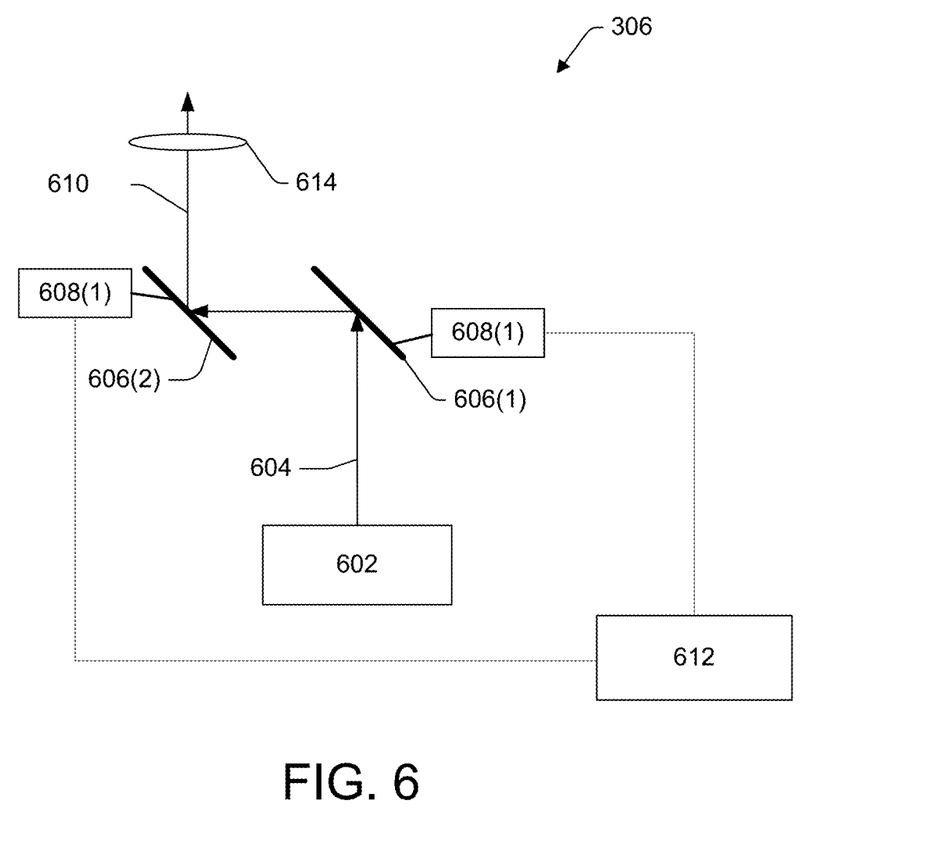
FIG. 6 depicts an example projector arrangement.

FIG. 6 shows an illustrative projector arrangement according to embodiments. The example projector 306 may be incorporated into an ARFN such as those shown in FIG. 2, or may operate separately from an ARFN. In some embodiments, the projector 306 is a raster-scanning laser projector.

As shown in FIG. 6, example projector 306 includes a light source 602. In some embodiments, light source 602 is a collimated source of visible light. For example, light source 602 may be a laser. However, embodiments are not so limited, and in some embodiments light source 602 may be another type of collimated light source. Light source 602 emits collimated light 604.

Example projector 306 may further include one or more mirrors to direct the collimated light generated by light source 602. In the example shown, example projector 306 includes two mirrors—mirror 606(1) to control the beam in a first dimension (e.g., in the horizontal direction) and mirror 606(2) to control the beam in a second dimension (e.g., in the vertical direction). Embodiments may incorporate any number of mirrors to control the direction of the output light, e.g. for raster scanning. Each mirror may be mechanically coupled with a motor to control the orientation of the mirror and the frequency of motion of the mirror. As shown in FIG. 6, motor 608(1) controls mirror 606(1) and motor 608(2) controls mirror 606(2). Collimated light 604 is reflected by mirrors 606(1) and 606(2) to produce a directed collimated light 610, directed in the desired direction to achieve controlled scanning across a surface.

In some embodiments, example projector 306 includes a control unit 612 to send signals to motors 608(1) and 608(2) to control the range and frequency of mirrors 606(1) and 606(2) respectively. In some embodiments, control unit 612 may further control the light source 602 (e.g., changing the frequency of the generated light). By controlling the motion of mirrors 606(1) and 606(2), embodiments may operate to control the size of the projected pixels to compensate for distortion effects of projecting to a non-perpendicular surface, as described herein. In some embodiments example projector 306 may also include one or more despeckling or denoising components 614 (e.g., operating as a vibrating diaphragm or other type of despeckle).

Illustrative Process and Interfaces

Figure 7:
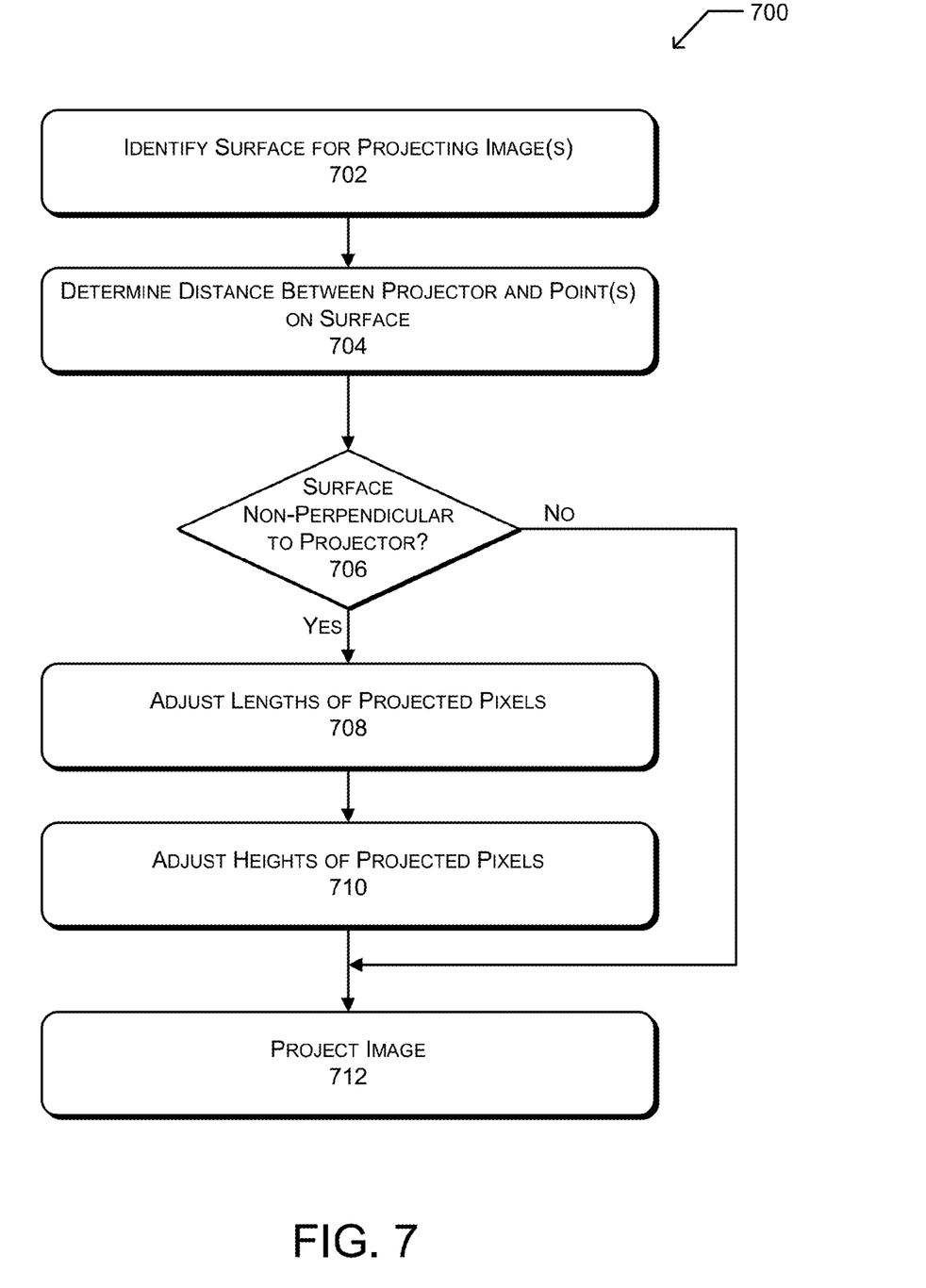
FIG. 7 depicts a flow diagram of an illustrative process for aspect corrected projection of images.

FIG. 7 depicts a flowchart for an example process in accordance with various embodiments. The operations of the example processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular data types. The order in which the operations are described is not intended to be construed as a limitation, and any number of the described operations may be executed in any order, combined in any order, subdivided into multiple sub-operations, and/or executed in parallel to implement the described process.

In some embodiments, the process depicted in FIG. 7 executes on a computing device such as computing device(s) 218, and/or include operations performed by one or more components of computing device 400.

FIG. 7 depicts a flow diagram of an illustrative process 700 for aspect correction of image projection, in accordance with embodiments. At 702, a surface is identified for projecting images (e.g., video images). In some embodiments, identification of a surface is based on sensor data indicating a location of a user in environment 200, and/or may be indicated by a user through a gesture, sound, or other means.

At 704, one or more distances are determined between points on the surface and the projector. Distance determination may be based on sensor data from sensors incorporated into or external to one or more ARFN, and may be based on structured light, radar, LIDAR, ultrasonic ranging, stereoscopic ranging, ToF measure, echolocation, and/or other means of determining distance or any combination thereof.

At 706, in some embodiments distance information may be analyzed to determine whether the projection surface is non-perpendicular to the projector over the entire projection surface or over one or more portions of the projection surface. In cases where the surface is perpendicular or sufficiently perpendicular (e.g., where the angle of incidence of light from the projector against the surface is within a predetermined threshold tolerance of 90 degrees), the image may be projected onto the surface without any adjustments made to pixel size. In this way, embodiments may avoid expending computational resources to perform pixel size adjustments in cases where a non-adjusted projected image is adequate.

At 708, if it is determined that the surface is non-perpendicular, pixel lengths may be adjusted. Within each scan line, the lengths of pixels in the line may be modulated to correct for distortion, so that length of each pixel as projected onto the surface is approximately equal. In some embodiments, a modulation frequency for a light emitter that generates the pixels is varied to modify the pixel lengths. In some embodiments, a modulation intensity may be varied along with the frequency to provide for a more equal intensity of the projected pixels even as the frequency of pixel generation is altered. Moreover, in some embodiments, pixel length is modulated by varying a scanning speed, for example by changing a speed at which various scan-controlling mirrors are moving within the raster-scanning laser projector.

At 710, the height of the pixels may be similarly adjusted to compensate for distortion. In some embodiments, this includes adjusting spacing between scan lines. In some embodiments, this may be accomplished by modulating the angle at which a MEMS mirror within a raster-scanning laser projector reflects the beam, to project the lines with a more equal spacing on the projection surface. Some embodiments may employ multiple mirrors for controlling scanning (e.g., two mirrors for two dimensional adjustment), and in such cases the movement speed of each mirror may be modified to achieve the desired line spacing and/or scanning speed. In embodiments employ raster-scanning laser projectors that include MEMS mirrors to control direction and movement of the scan line, the pixel height may be altered by changing the direction of the MEMS mirrors through a change in the excitation voltage. At 712, the pixel-adjusted image is projected.

Although 708, 710, and 712 are depicted as separate steps, it should be noted that these operations to change the length and height of pixels, and to project the image, are generally performed simultaneously as the raster scanning progresses. Each pixel along a scan line is adjusted in length, and each scan line is modulated to adjust distance between scan lines and thus adjust pixel height. Taken together, these adjustments in pixel size may compensate for distortion that would otherwise be present in the projected image.

Moreover, some embodiments may employ additional technique(s) for modulating the size of the pixels, in addition to or instead of the techniques described above. For example, some embodiments may employ a material or lens that can modulate the focus of the collimated beam, to allow the display of larger or smaller pixels depending on the modulated focus. In such cases, for farther surfaces embodiments may provide a better or sharper focus (e.g., a smaller displayed pixel), and for closer surfaces embodiments may provide a less focused (e.g., larger) pixel.

Conclusion

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method comprising:
projecting, using a projector, an image onto a surface;
measuring one or more distances between the projector and one or more corresponding points of the surface;
determining whether the surface is non-perpendicular in relation to an optical path of the projector, based on the one or more measured distances;
determining, based at least in part on the one or more measured distances, a distortion of one or more pixels of the projected image caused by the surface being non-perpendicular in relation to the optical path of the projector; and
in conjunction with projecting the image onto the surface, varying a length and a height of one or more individual pixels of the projected image substantially simultaneously based at least in part on the one or more measured distances to correct for the distortion.

2. The method of claim 1, wherein varying the length of the one or more individual pixels includes changing a modulation frequency of the projector to alter the length of the one or more individual pixels.

3. The method of claim 1, wherein the projector employs a raster-scanning laser, and wherein varying the length of the one or more individual pixels includes changing a scanning speed of the projector for scanning across each of a plurality of scan lines that include the one or more individual pixels.

4. The method of claim 1, wherein the projector employs a raster-scanning laser, and wherein varying the height of the one or more individual pixels includes changing a separation between a plurality of scan lines that include the one or more individual pixels.

5. The method of claim 1, wherein measuring the one or more-distances is based at least in part on sensor data generated by at least one sensor.

6. The method of claim 1, wherein varying the length of the one or more individual pixels includes varying the length inversely with the distance between the projector and the one or more points of the surface, and wherein varying the height of the one or more individual pixels includes varying the height inversely with the distance between the projector and the one or more points of the surface.

7. A computer-implemented method comprising:
projecting, using a projector, an image onto a surface;
determining one or more distances between the projector and one or more corresponding points of the surface;
determining whether the surface is non-perpendicular in relation to an optical path of the projector; and
in conjunction with projecting the image onto the surface, varying a length and a height of one or more individual pixels of the projected image substantially simultaneously based at least in part on the one or more distances.

8. The method of claim 7, wherein determining whether the surface is non-perpendicular includes determining at least one variation in the one or more distances.

9. The method of claim 7, wherein the projector employs a raster-scanning laser to project the image.

10. The method of claim 7, wherein the image is included in a sequence of images forming a video.

11. The method of claim 7, wherein varying at least one of the length or the height of the one or more individual pixels at least partly corrects for a keystone effect caused by the surface being non-perpendicular in relation to the optical path of the projector.

12. The method of claim 7, wherein varying the length of the one or more individual pixels includes varying the length inversely with the distance between the projector and the one or more points of the surface.

13. The method of claim 12, wherein varying the length of the one or more individual pixels includes changing a modulation frequency of the projector to alter the length of the one or more individual pixels.

14. The method of claim 12, wherein varying the length of the one or more individual pixels includes changing a scanning speed of the projector for scanning across each of a plurality of scan lines that include the one or more individual pixels.

15. The method of claim 7, wherein varying the height of the one or more individual pixels includes varying the height inversely with the distance between the projector and the one or more points of the surface.

16. The method of claim 15, wherein varying the height of the one or more individual pixels includes changing a separation between a plurality of scan lines that include the one or more individual pixels.

17. The method of claim 16, wherein changing the separation between the plurality of scan lines includes modulating a raster scan excitation voltage of one or more mirrors included in the projector.

18. The method of claim 17, wherein the one or more mirrors are micro-electromechanical system (MEMS) mirrors.

19. A system comprising:
a projector;
a memory;
at least one processor in communication with the memory; and
at least one projection control component stored in the memory and executable by the at least one processor to:
project, using the projector, an image onto a surface;
determine one or more distances between the projector and one or more corresponding points of the surface;
determine whether the surface is non-perpendicular in relation to an optical path of the projector, based at least in part on the one or more distances;
generate data for one or more individual pixels for the image to be projected onto the surface, including determining a length and a height of the one or more individual pixels based at least in part on the one or more distances between the projector and the one or more points of the surface; and
provide a signal to the projector, the signal including the generated data for the one or more individual pixels; and
in conjunction with projecting the image onto the surface, varying the length and the height of the one or more individual pixels of the projected image substantially simultaneously based at least in part on the generated data.

20. The system of claim 19, wherein varying the length of the one or more individual pixels includes changing a modulation frequency of the projector to alter the length of the one or more individual pixels.

21. The system of claim 19, wherein varying the length of the one or more individual pixels includes changing a scanning speed of the projector for scanning across each of a plurality of scan lines that include the one or more individual pixels.

22. The system of claim 19, wherein varying the height of the one or more individual pixels includes changing a projected distance between a plurality of scan lines that include the one or more individual pixels by modulating a raster scan excitation voltage of one or more mirrors included in the projector.

23. One or more non-transitory computer-readable storage media storing instructions that, when executed, instruct at least one processor to perform actions comprising:
projecting, using a projector, an image onto a surface;
determining one or more distances between the projector and one or more corresponding points of the surface;
determining whether the surface is non-perpendicular in relation to an optical path of a projector, based on at least one variation in the one or more distances;
in conjunction with projecting the image onto the surface, varying a length and a height of one or more individual pixels of the projected image substantially simultaneously based at least in part on the one or more distances.

24. The one or more computer-readable storage media of claim 23, wherein varying the length of the one or more individual pixels includes varying the length inversely with the one or more distances between the projector and the one or more points of the surface.

25. The one or more computer-readable storage media of claim 24, wherein varying the length of the one or more individual pixels includes changing a modulation frequency of the projector to alter the length of the one or more individual pixels.

26. The one or more computer-readable storage media of claim 24, wherein varying the length of the one or more individual pixels includes changing a scanning speed of the projector for scanning across each of a plurality of scan lines that include the one or more individual pixels.

27. The one or more computer-readable storage media of claim 23, wherein varying the height of the one or more individual pixels includes varying the height inversely with the one or more distances between the projector and the one or more points of the surface.

28. The one or more computer-readable storage media of claim 27, wherein varying the height of the one or more individual pixels includes changing a separation between a plurality of scan lines that include the one or more individual pixels.

* * * * *